Patented Nov. 27, 1928.

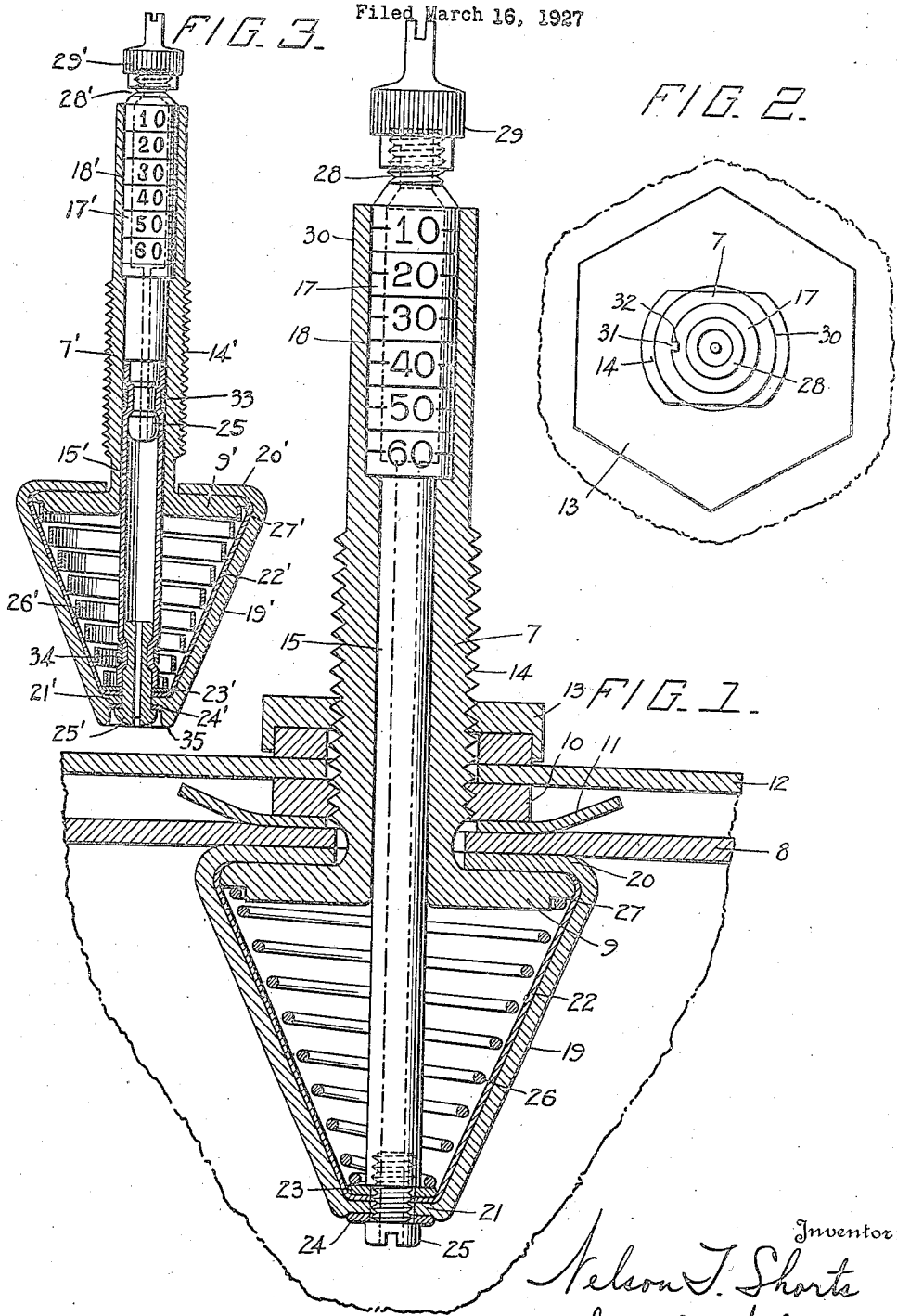

1,693,528

UNITED STATES PATENT OFFICE.

NELSON T. SHORTS, OF FERN, PENNSYLVANIA.

TIRE VALVE STEM AND PRESSURE GAUGE.

Application filed March 16, 1927. Serial No. 175,830.

The present invention relates to pressure gauges for pneumatic tires, and aims to provide a novel and improved tire valve stem and pressure gauge.

Another object of the invention is the provision of a device of that kind adapted to be secured to the inner tube of a tire and having a bulb within the tire tube which when collapsed by the air pressure will indicate the pressure.

A further object is the provision of such a device comprising a novel assembly of elements including a bulb and spring to be disposed within the inner tube of the tire, and an indicating member movable with said bulb.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a median section of the device, portions being shown in elevation.

Fig. 2 is an end view of the device with the cap removed.

Fig. 3 is a median section of a modified form of device embodying the improvements, portions being shown in elevation.

In carrying out the invention there is provided a barrel 7 which corresponds with the barrel of an ordinary valve stem of an inner tube of a pneumatic tire, said barrel 7 extending through an aperture in the inner tube 8 and having a disk-like flange 9 at that end of the barrel within the tube. The nut 10 is threaded on the barrel 7 to clamp the tube 8 between said flange 9 and nut 10, the usual elongated washer 11 being disposed between the nut 10 and tube 8. The barrel 7 extends through an aperture in the wheel rim 12, and a nut 13 is threaded on the barrel 14 to bear against the rim 12 to close the aperture thereof and prevent displacement of the barrel 7. The threaded portion 14 of the barrel 7 has opposite flat sides similar to ordinary tire valve stems, and the washer 11 has a hole of corresponding form to prevent said washer from turning. In fact, the threaded portion 14 of the barrel 7, nuts 10 and 13 and washer 11 are similar to those now used on ordinary valve stems.

A tubular indicating member 15 extends through the barrel 7 for sliding movement and has an enlarged portion 17 movable within a counterbore 18 in the end portion of the barrel 7 opposite to the flange 9, and said portion 17 is graduated to indicate, at the end of the barrel 7, the pressure of air in the tire, as will hereinafter more fully appear.

The gist of the invention resides in the provision of a bulb 19 within the tire tube 8 between the inner ends of the barrel 7 and member 15 for moving said member in proportion to the air pressure. The bulb 19 is composed of rubber or other flexible material and is of conical form as shown, being provided with inturned flanges or end portions 20 and 21 at its larger and smaller diametered ends, respectively. The flange 20 is clamped between the flange 9 and tube 8, and the bulb 19 has a lining or shield 22 therein to protect it from injury by contact with the spring 26. The flange 21 is clamped between washers 23 and 24 disposed on a screw 25 that is threaded into the inner end of the member 15, the washer 23 seating against said end of the member 15. The screw 25 is tubular or has a hole therethrough for the passage of air which flows through the member 15. The member 15 is therefore movable with the smaller diametered or apical portion of the bulb 19.

The spring 26 is conical, with its smaller diametered portion bearing against the washer 23 and its larger diametered portion seating within a marginal rabbet 27 with which the flange 9 is provided. The spring 26 serves two functions, in that it moves the member 15 inwardly, and the spring also prevents the bulb 19 from collapsing radially inward under the air pressure.

The outer end of the member 15 has a screw-threaded portion 28 to receive the usual cap 29, and the outer end portion of the barrel 7 is smooth in order to receive a slip cap (not shown) to enclose the cap 29 and outer terminal of the indicating member 15. The barrel 7 has an inwardly extending key 31 received by a longitudinal groove 32 in the portion 17 of the member 15 to prevent said member from rotating, but permitting it to slide longitudinally.

The device serves as a valve stem, the tire being readily inflated through the member 15 when the cap 29 is removed, the usual valve element being located within the portion 17 of the member 15.

The pressure of air within the tire is indicated by the projection of the portion 17 of the member 15 from the barrel 7, the air pressure in acting against the bulb 19 causing said bulb to collapse toward the flange 9 and larger or base end of the bulb. In other words, as the air pressure increases the bulb 19 is collapsed and the height of the bulb 19 and spring 26 decreases, said bulb and spring moving toward a flat condition which they would assume if completely collapsed against the flange 9. However, under normal pressures the bulb 19 and spring 26 are not completely collapsed. By using the bulb 19 and spring 26 within the tire they may be of larger diameter than corresponding elements heretofore used within the barrels of pressure gauges, and the bulb and spring may be larger and more rugged in construction, whereby the device will have greater life and efficiency.

In the device shown in Fig. 3, a hollow member or plunger 17' is slidable in the barrel 7' and has the threaded portion or nipple 28' at its outer end on which the removable cap 29' is engaged, and said barrel has the flange 9' and screw threads 14'. The member 17' has a nipple 25'' at its inner end spaced outwardly beyond the flange 9', and a flexible tube 15' has its outer end portion fitted on the nipple 25'' and secured thereon by a band 33 embracing said tube and nipple. The inner terminal of the tube 15' is connected to the smaller or apical end portion of the bulb 19', and for this purpose a nipple or screw 25' is provided on which the inner end portion of the tube 15' is clamped by means of a band 34. Washers or collars 23' and 24' are disposed on the nipple 25' and receive the flange 21' of the bulb, the flange 20' thereof overlapping the barrel flange 9'. The smaller end of the bulb has an annular portion 35 surrounding the head of the nipple or screw 25' as a protection to the inner tube of the tire should the tire become deflated. The tube 15' being flexible will permit said tube to be bent with the bulb 19' should the tire become deflated, so that the device will not be injured or parts broken. The spring 26' disposed between the collar 23' and rabbet 27' of the flange 9' is composed of a strip of metal, as shown, in order that the bulb 19' and lining 22' cannot be forced inwardly between the convolutions of the spring by the air pressure.

Having thus described the invention, what is claimed as new is:—

1. A tire pressure gauge comprising a barrel having means for attachment to the inner tube of a tire, an indicating member slidable in said barrel, a bulb connected to said barrel to be disposed within said tube, and a flexible portion connecting said member and bulb.

2. The combination with the inner tube of a tire, of a tire pressure gauge comprising relatively movable members, one of which is attached to said tube, and a bulb connected to said members and disposed within said tube.

3. The combination with the inner tube of a tire, of a tire pressure gauge comprising relatively movable members, one of which is attached to said tube, a bulb connected to said members and disposed within said tube, and a spring within said bulb to move said members relatively to one another in a direction to expand said bulb.

4. The combination with the inner tube of a tire, of a tire pressure gauge comprising a barrel attached to said tube, a member slidable in said barrel, and a bulb connected to said barrel and member and disposed within said tube.

5. The combination with the inner tube of a tire, of a tire pressure gauge comprising a barrel attached to said tube, a member slidable in said barrel, a bulb connected to said barrel and member and disposed within said tube, and a spring within said bulb and arranged between said barrel and member to move said member inwardly.

6. The combination with the inner tube of a tire, of a tire pressure gauge comprising a barrel having a flange at one end disposed within said tube, a member slidable through said barrel, and a bulb secured to said member and having an inturned flange between said barrel flange and tube.

7. The combination with the inner tube of a tire, of a tire pressure gauge comprising a barrel having a flange at one end disposed within said tube, a member slidable through said barrel, a bulb secured to said member and having an inturned flange between said barrel flange and tube, means on the barrel to clamp said tube and bulb flange against said barrel flange, and a spring within the bulb confined between said barrel flange and said member.

8. The combination with the inner tube of a tire, of a tire pressure gauge comprising a barrel having a flange at one end disposed within said tube, a member slidable through said barrel, a conical bulb having its smaller end attached to said member and having an inturned flange at its larger diametered portion disposed between said barrel flange and tube, a conical spring within said bulb confined between said member and barrel flange with its larger diametered portion bearing against said barrel flange, and means on said barrel to clamp said tube and bulb flange between it and said barrel flange.

In testimony whereof I hereunto affix my signature.

NELSON T. SHORTS.